US009275382B2

(12) United States Patent
Dubois et al.

(10) Patent No.: US 9,275,382 B2

(45) Date of Patent: Mar. 1, 2016

(54) RECONFIGURABLE CHECKOUT STATION

(71) Applicant: Toshiba Global Commerce Solutions Holdings Corporation, Tokyo (JP)

(72) Inventors: Thierry Dubois, Coulommiers (FR); Pierre Luguern, Paris (FR); Catherine Mengin, Val de Marne (FR)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 14/340,769

(22) Filed: Jul. 25, 2014

(65) Prior Publication Data

US 2016/0026985 A1 Jan. 28, 2016

(51) Int. Cl.

| | |
|---|---|
| ***G06Q 20/18*** | (2012.01) |
| ***G07G 1/00*** | (2006.01) |
| ***G07G 1/06*** | (2006.01) |
| ***G07G 1/12*** | (2006.01) |
| ***G06Q 20/20*** | (2012.01) |
| ***A47F 9/04*** | (2006.01) |
| *G06K 15/00* | (2006.01) |

(52) U.S. Cl.

CPC *G06Q 20/18* (2013.01); *A47F 9/04* (2013.01); *A47F 9/043* (2013.01); *A47F 9/047* (2013.01); *G06Q 20/20* (2013.01); *G07G 1/0045* (2013.01); *G07G 1/06* (2013.01); *G07G 1/12* (2013.01); *A47F 9/045* (2013.01)

(58) Field of Classification Search

CPC ........... A47F 9/047; A47F 9/04; A47F 9/043; A47F 9/045

USPC .......................................................... 235/383

See application file for complete search history.

(56) References Cited

U.S. PATENT DOCUMENTS 3,025,651 A * 3/1962 Stanley ........................ 53/386.1

4,953,664 A * 9/1990 Vrooman et al. ............... 186/59

(Continued)

FOREIGN PATENT DOCUMENTS

| | | |
|---|---|---|
| EP | 0664530 A2 | 7/1995 |
| EP | 2266443 A1 | 12/2010 |
| FR | 2745936 A3 | 9/1997 |

OTHER PUBLICATIONS

"Check out KC location for Sam's Club efficiency initiative", http://www.retailingtoday.com, Oct. 18, 2012, http://www.retailingtoday.com/article/check-out-kc-location-sam%E2%80%99s-club-efficiency-initiative.

(Continued)

*Primary Examiner* — Thien M Le

*Assistant Examiner* — Claude J Brown

(74) *Attorney, Agent, or Firm* — Coats & Bennett, PLLC

(57) ABSTRACT

A checkout station for a retail store is configurable between an employee-assisted mode and a self-service mode. In the employee-assisted mode, the checkout station is positioned on a checkout lane and a merchant operates the checkout station to checkout a customer from the store. In the self-service mode, the checkout station is positioned on the opposite side of the checkout lane and the customer performs the checkout functions with little or no help from the merchant. A motor in the checkout station is controlled to move the entire checkout station laterally across the checkout lane in response to receiving reconfiguration commands from the merchant. The reconfiguration commands may also control the checkout station to raise or lower its vertical height.

18 Claims, 5 Drawing Sheets

(56) References Cited

U.S. PATENT DOCUMENTS

| | | | | |
|---|---|---|---|---|
| 5,211,263 | A * | 5/1993 | Davidson et al. | 186/61 |
| 5,412,193 | A | 5/1995 | Swartz et al. | |
| 5,492,199 | A * | 2/1996 | Shimoyama | 186/61 |
| 5,497,853 | A | 3/1996 | Collins, Jr. et al. | |
| 6,286,758 | B1 * | 9/2001 | Dejaeger et al. | 235/383 |
| 6,296,185 | B1 | 10/2001 | Dejaeger | |
| 6,390,363 | B1 | 5/2002 | Morrison et al. | |
| 6,394,345 | B1 | 5/2002 | Dejaeger et al. | |
| 6,427,915 | B1 * | 8/2002 | Wike et al. | 235/383 |
| 7,127,706 | B2 | 10/2006 | Mason | |
| 7,621,446 | B2 | 11/2009 | Addison et al. | |
| 7,866,546 | B1 * | 1/2011 | Vance | 235/379 |
| 8,240,563 | B2 | 8/2012 | Kaplan et al. | |
| 2003/0006098 | A1 * | 1/2003 | Wike et al. | 186/61 |
| 2004/0041021 | A1 * | 3/2004 | Nugent, Jr. | 235/383 |
| 2007/0138269 | A1 * | 6/2007 | Baitz et al. | 235/383 |
| 2007/0235531 | A1 * | 10/2007 | Addison et al. | 235/383 |
| 2010/0044157 | A1 * | 2/2010 | Marshall et al. | 186/61 |
| 2013/0153656 | A1 | 6/2013 | Skiles | |
| 2013/0191230 | A1 | 7/2013 | Edwards | |
| 2014/0209675 | A1 * | 7/2014 | Collins et al. | 235/383 |

OTHER PUBLICATIONS

"Windcor Nixdorf to present 'Always Open' checkout solution at NRF Big Show", http://www.kioskmarketplace.com/ article, Dec. 28, 2012, http://www.kioskmarketplace.com/article/205861/Wincor-Nixdorf-to-present-Always-Open-checkout-solution-at-NRF-Big-Show.

"NCR SelfServ Checkout Enterprise Tools", 2013, http://www.ncr.com/products/gm/self-checkout-systems/self-checkout-tools.

* cited by examiner

RECONFIGURABLE CHECKOUT STATION

FIELD OF INVENTION

The present disclosure relates generally to checkout stations for retail businesses, and more particularly, to hybrid checkout stations that may be reconfigured between operating in an employee-assisted mode and a self-service mode.

BACKGROUND

A Point-of-Service (POS) is often referred to as a location where operations in support of retail transactions are conducted. A POS may be the point where a customer makes a payment to a merchant in exchange for goods or services. Further, the merchant may, at the POS, calculate an amount owed by the customer and provide options for the customer to make payment. A payment may be made by, for example, cash, a credit card, a debit card, or check. The merchant may also issue a receipt to the customer for the transaction. Customers may also return purchased goods to the POS.

To facilitate such retail transactions, a merchant may deploy one or more checkout stations having POS terminals and a scanner. In most cases, a checkout station is configured to operate in an "employee-assisted" mode in which the merchant (or an employee of the merchant) scans each item for a customer, accepts payment for the scanned items from the customer, and places the purchased items in a bag for the customer. Such employee-assisted checkout stations enable the merchant to personally interact with the customer. In some cases, however, checkout stations are configured to operate in a "self-checkout" mode. In this mode, the customer has little or no interaction with the merchant, and performs the scanning, payment, and bagging functions typically performed by the merchant.

SUMMARY

Embodiments of the present disclosure provide a method, an apparatus, and a computer program product for reconfiguring a hybrid checkout station between operating in an employee-assisted mode in which the merchant or an employee of the merchant performs a checkout process to checkout a customer, and a self-service mode in which the customer performs the checkout process with little or no assistance from the merchant.

In one embodiment, a method for reconfiguring a hybrid checkout station configured to operate in one of an employee-assisted mode and a self-service mode to receive a user command to operate in the other of the employee-assisted mode and the self-service mode. Responsive to receiving the command, a motor at the hybrid checkout station is actuated to move the hybrid checkout station laterally across a checkout lane from a first position to a second position. When the hybrid checkout station is in the second position, the method calls for operating the hybrid checkout station in the other of the employee-assisted mode and the self-service mode.

In another embodiment, the present disclosure provides a hybrid checkout station apparatus that may be reconfigured by a merchant between an employee-assisted and self-service mode. In this embodiment, the hybrid checkout station comprises a user interface and a processor circuit. The user interface is configured to receive user commands associated with controlling an operating mode of the hybrid checkout station. The processor circuit is configured to receive a user command to reconfigure the hybrid checkout station to operate in the other of the employee-assisted mode and the self-service mode, and to move the hybrid checkout station laterally across the checkout lane from a first position to a second position responsive to receiving the user command.

In another embodiment, the present disclosure also provides a computer program product for a hybrid checkout station. The computer program product comprises a computer readable medium having computer code stored thereon that is executed by a processing circuit at the hybrid checkout station. Particularly, the hybrid checkout station operates in one of an employee-assisted mode and a self-service mode. When executed by the processor circuit, the computer code controls the processor circuit, responsive to receiving a user command, to reconfigure the hybrid checkout station to operate in the other of the employee-assisted mode and the self-service mode. The computer code also controls the processor circuit to actuate a motor at the hybrid checkout station to move the hybrid checkout station laterally across a checkout lane from a first position on the checkout lane to a second position on the checkout land. So moved, the hybrid checkout station may then be operated in the other of the employee-assisted mode and the self-service mode.

Of course, those skilled in the art will appreciate that the present embodiments not limited to the above contexts or examples, and will recognize additional features and advantages upon reading the following detailed description and upon viewing the accompanying drawings.

DETAILED DESCRIPTION

Embodiments of the present disclosure provide a hybrid checkout station, such as those used by retailers or merchants, for example. The hybrid checkout station is configured to switch between an "employee-assisted" operating mode, in which a merchant or employee of the merchant performs the checkout of a customer, and a "self-service" operating mode in which the customer performs the checkout and is aided by the merchant upon request. Switching between these operating modes is done responsive to receiving one or more commands at the hybrid checkout station from the merchant.

When in the employee-assisted mode, the hybrid checkout station is generally positioned on a first side of a checkout lane. Additionally, the hybrid checkout station is configured to be at a height that allows for the merchant checking out the customer to sit on a stool or chair at the hybrid checkout station, if desired, while performing the checkout process. Upon receiving a command to switch to the self-service mode, a motor in the hybrid checkout station moves the entire station laterally across the checkout lane to the opposite side of the checkout lane. Additionally, the height of the hybrid checkout station is lowered to facilitate the customer's ability to scan items and perform the checkout process.

Similarly, upon receiving a command to switch back to the employee-assisted mode, the motor moves the entire the hybrid checkout station laterally back across the checkout lane. Additionally, the height of the hybrid checkout station is once again raised to facilitate the merchant's ability to scan items and perform the checkout process.

Figure 1:
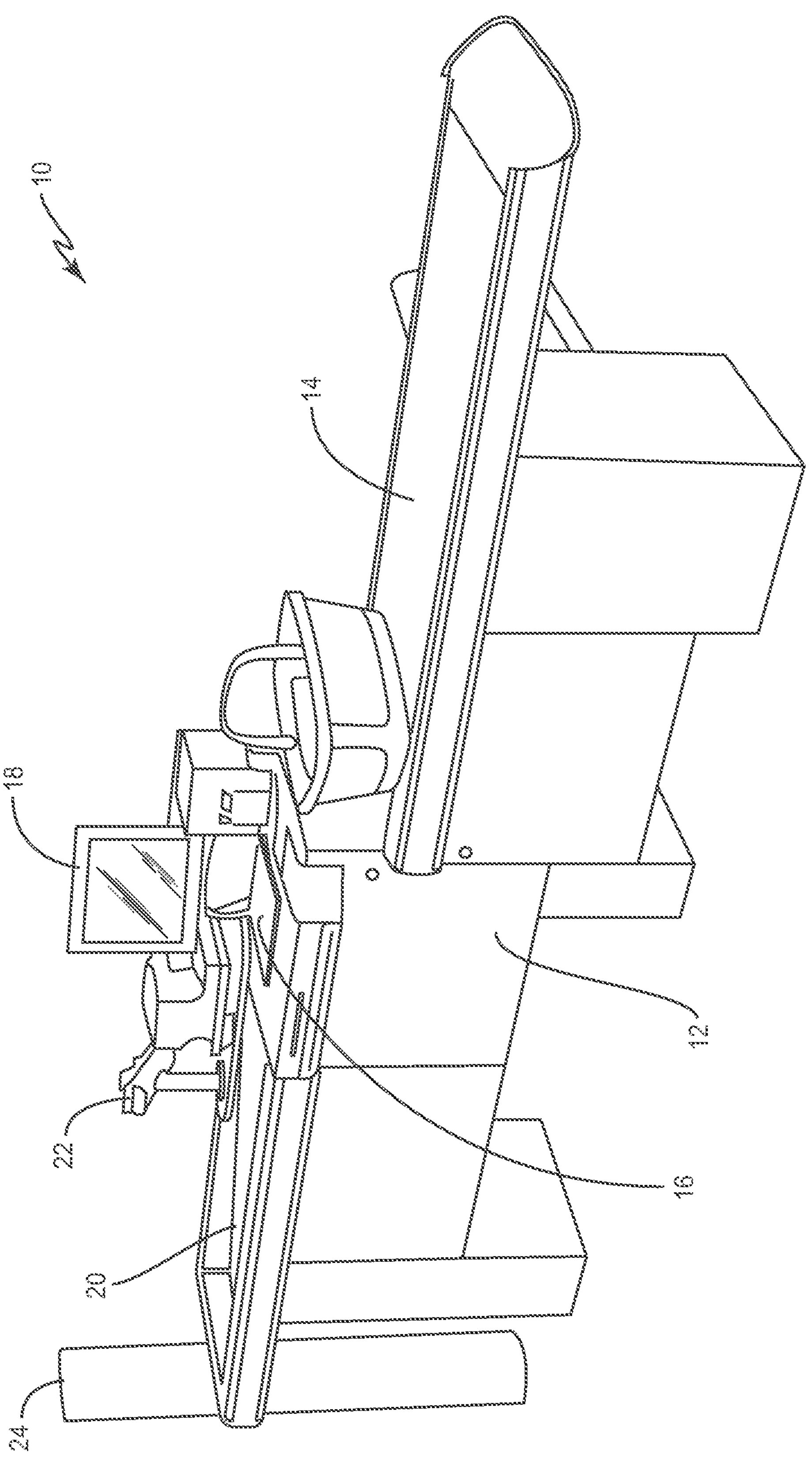
FIG. 1 is a perspective view of a hybrid checkout station configured according to one embodiment of the present disclosure.

Turning now to the drawings, FIG. 1 is a perspective view of a hybrid checkout station 10 configured according to one embodiment of the present disclosure. The hybrid station 10 seen in FIG. 1 is an example of a hybrid checkout station that may be found in stores such as grocery stores, retail stores, and the like. However, those of ordinary skill in the art should readily appreciate that this is for illustrative purposes only. A hybrid station 10 configured according to the embodiments of the present disclosure may, in fact, be utilized in other stores.

As seen in FIG. 1, the hybrid station 10 comprises a housing or cabinetry 12, a conveyor belt 14, an optical scanner 16, a display device 18, a scale area 20, and a pay station 22. Alternatively, a pay station may be placed proximate one end of the hybrid station 12, such as seen by pay station 24. Regardless of the placement, however, pay stations 22, 24 may comprise a magnetic strip reader through which a customer swipes a credit or debit card, and a pinpad to allow the customer to enter a Personal Identification Number (PIN) and/or other payment information.

Cabinetry 12 comprises a structure that houses the different components of the hybrid station 10. For example, the cabinetry 12 may comprise shelving, drawers, and other storage areas in which a merchant can place small items. However, cabinetry 12 is also configured and sized to house other components associated with the different functions of the hybrid station 10. Such components include, but are not limited to, the drive mechanisms for driving the conveyor belt 14, one or more computing devices associated with the register functions of the hybrid station 10, cabling, and various other communications components that allow the hybrid station 10 to communicate via one or more remote servers.

As described later in more detail, the cabinetry 12 also houses one or more motors that move the hybrid station 10 laterally across a checkout lane in response to receiving user commands. In addition to this lateral movement, some embodiments of the cabinetry 12 also house the motors and drive mechanisms to alter the vertical height of the hybrid station 10 depending on the selected operating mode. In the employee-assisted mode, for example, the hybrid station 10 is raised to a first height so that a merchant at the hybrid station 10 can, if desired, sit on a chair or stool while performing the checkout process. In the self-service mode, however, the hybrid station 10 is lowered to a second height that is more conducive to allowing the customers to perform the checkout operations on their own.

The conveyor belt 14 may comprise any endless belt known in the art and is configured to move items placed on the belt 14 by the customer closer to the optical scanner 16. Generally, one or more sensors (not shown) associated with the conveyor belt 14 detect the placement or position of the selected items on the belt 14, and provide signals to a belt drive mechanism within the cabinetry 12 to start and stop the conveyor belt 14. Once the items are near the optical scanner 16, the merchant or the customer, depending on the current operating mode of the hybrid station 10, may scan the item to identify the item and determine price, as is known in the art.

The optical scanner 16 may comprise any type of scanner known in the art, but in one embodiment, is configured to scan bar codes printed on the items or their packaging. A computing device housed within cabinetry 12 receives information from the optical scanner 16 and sends the information to a remote server (not shown) in one or more messages using techniques well-known in the art. Upon receipt, the remote server may consult a database, for example, to identify the items and determine their prices, but returns that data to the computing device at the hybrid station 10. Upon receipt, the computing device at the hybrid station 10 displays text that identifies the selected item, its price, and other information for the merchant and the customer on display device 18.

The scale area 20 comprises circuitry that weighs the items after scanning when the hybrid station 10 is operating in the self-service mode. Such circuits are typically communicatively connected to the computing device within the cabinetry 12 and help to prevent customer fraud. Particularly, the information returned by the remote server for a given scanned item may include a weight for that item. After scanning the item, the customer would place the scanned item on the scale area 20. Circuitry associated with the scale area 20 would then weigh the item. If the measured weight did not match the weight reported by the remote server to within a predetermined tolerance, the computing device in the hybrid station 10 may be configured to sound an alarm or notify the merchant, for example. At any rate, once all items are scanned, the user can effect payment via the pay station 22, or pay station 24, as is well known in the art.

Figure 2B:
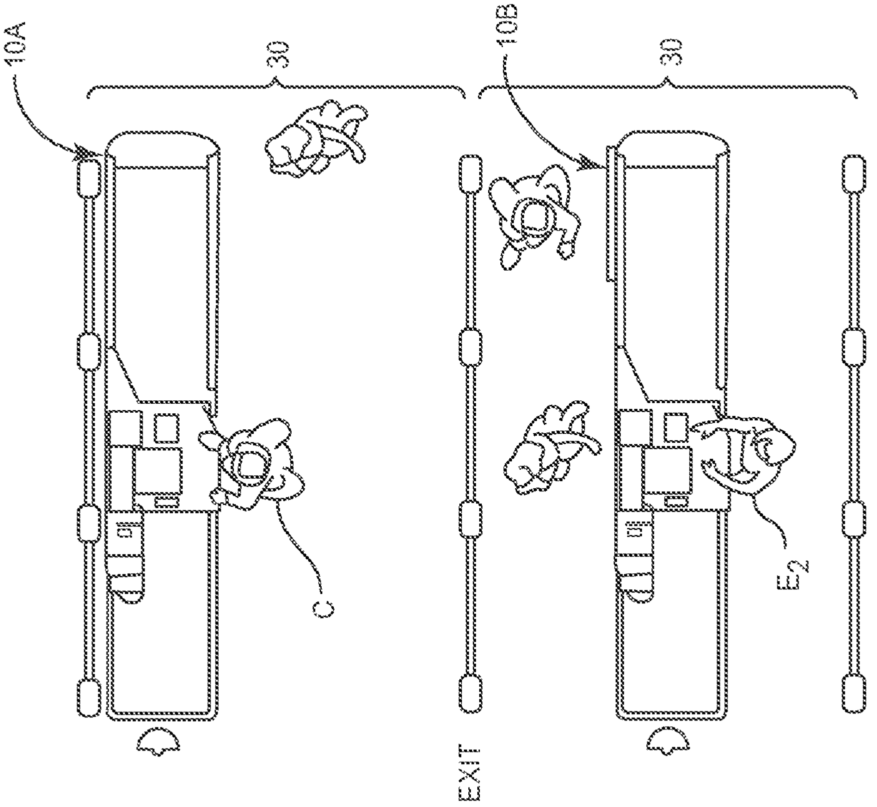
FIGS. 2A-2B are top views illustrating the lateral movement of a hybrid checkout station configured according to one embodiment of the present disclosure.
Figure 2A:
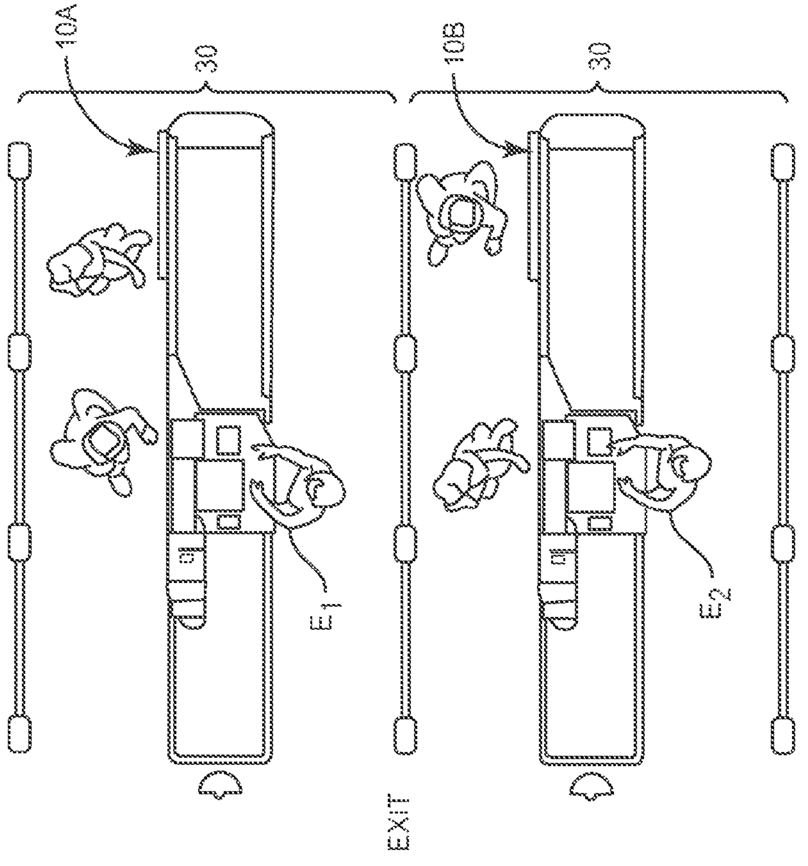

FIGS. 2A-2B are top views of multiple hybrid stations 10*a*, 10*b* (collectively referred to herein as hybrid stations 10) disposed in a retail environment. As seen in FIG. 2A each hybrid station 10 is positioned in its own checkout lane 30. In this figure, employees $E_1$, $E_2$ are scanning items selected by a customer for the customer, and are placing the scanned items in bags or sacks for the customers. Thus, in FIG. 2A, each hybrid station 10*a*, 10*b* is configured to operate in the "employee-assisted" mode.

At some point, however, one of the employees, such as employee $E_2$ of FIG. 2B, for example, may leave the hybrid station 10. In these cases, the merchant may decide to alter the operating mode of that particular hybrid station 10*a* from the employee-assisted mode to the self-service mode. That way, the merchant can continue serving customers at the hybrid station 10*a* regardless of whether an employee is available to staff that particular hybrid station 10*a*. Therefore, in accordance with one embodiment of the disclosure seen in FIG. 2B, the merchant simply enters a command into the hybrid station 10*a* utilizing, for example, a user input/output (I/O) interface communicatively connected to the hybrid station 10*a*. Upon receipt of the command, the computing device at the hybrid station 10*a* actuates a motor that moves the hybrid station 10*a*, as a complete unit, laterally across the checkout lane 30 to the opposite side of the checkout lane 30. In this position, the hybrid station 10*a* is configured to operate in the self-service mode to allow a customer C, rather than the merchant $E_1$, $E_2$, to perform the checkout process. Note, however, that a merchant has access to the functions of the hybrid station 10*a*, and thus, can assist the customers using the hybrid station 10.

Figures 3A, 3B:
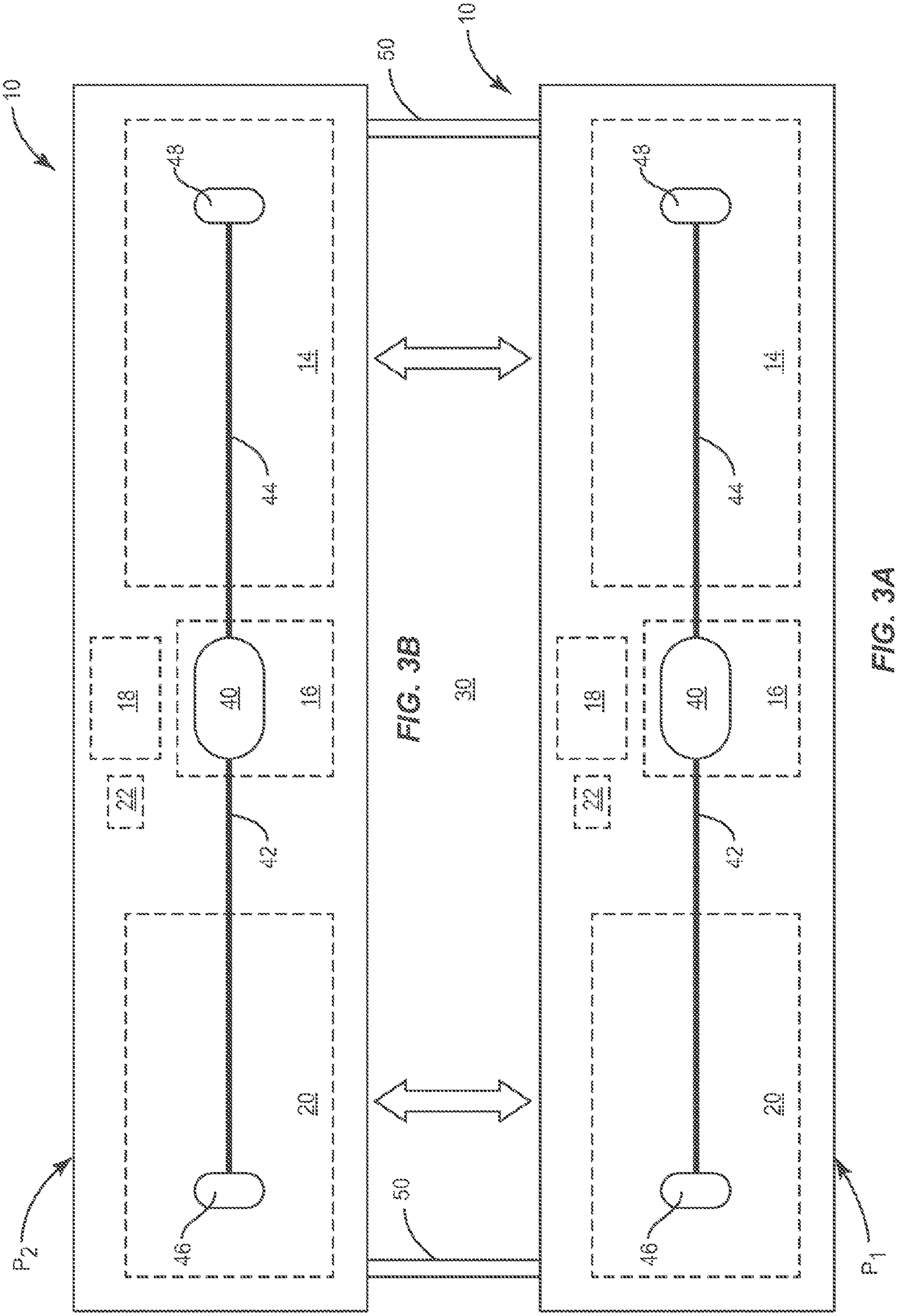
FIGS. 3A-3B are functional block diagrams illustrating some components for laterally moving a hybrid checkout station according to one embodiment of the present disclosure.

FIGS. 3A-3B are functional block diagrams showing some of the component parts of a hybrid checkout station 10 that effect the lateral movement of the hybrid station 10 according to one embodiment of the present disclosure. As those of ordinary skill in the art will note, the components seen in dashed relief in FIGS. 3A-3B illustrate their respective positions as seen in FIG. 1. As these components and their functions were discussed earlier, they are not further described here.

As seen in FIGS. 3A-3B, the hybrid station 10 comprises a motor 40. The motor 40 may comprise any motor or drive mechanism known in the art, but in this embodiment, is an electric motor that utilizes commercial power provided by the merchant. In one embodiment, for example, a power outlet connected to commercial power is located under the floor of the checkout lane 30. The motor 40 is electrically connected to this power outlet via appropriate cabling and connections (not shown) that are stored in, and that move with, the cabinetry 12.

A pair of wheels or tires 46, 48 is also operatively connected to the motor 40 via respective axles 42, 44. In operation, the motor 40 drives the wheels 46, 48 via axles 42, 44 to move the hybrid station 10 laterally across the checkout lane 30 responsive to the user command. More specifically, the motor 40 moves the entire hybrid station 10 from a first position on a first side of the checkout lane 30 (FIG. 3A) laterally across the checkout lane 30 to a second position on the opposite side of checkout lane 30 (FIG. 3B). Similarly, in response to receiving another command to reconfigure the hybrid checkout station 10, the motor 40 reverses the direction of travel and drives the wheels 46, 48 via axles 42, 44 to move the entire hybrid station 10 laterally back across the checkout lane 30 from the second position (FIG. 3B) to the first position (FIG. 3A). To aid in this lateral movement of the hybrid station 10 across the checkout lane 30, a pair of guiderails 50 may be disposed in the underlying floor surface. The guiderails 50 are configured to mate with one or more corresponding guides fixedly attached to the underside of cabinetry 12, and help the hybrid station 10 remain stable during the lateral movement across the checkout lane.

Figure 4:
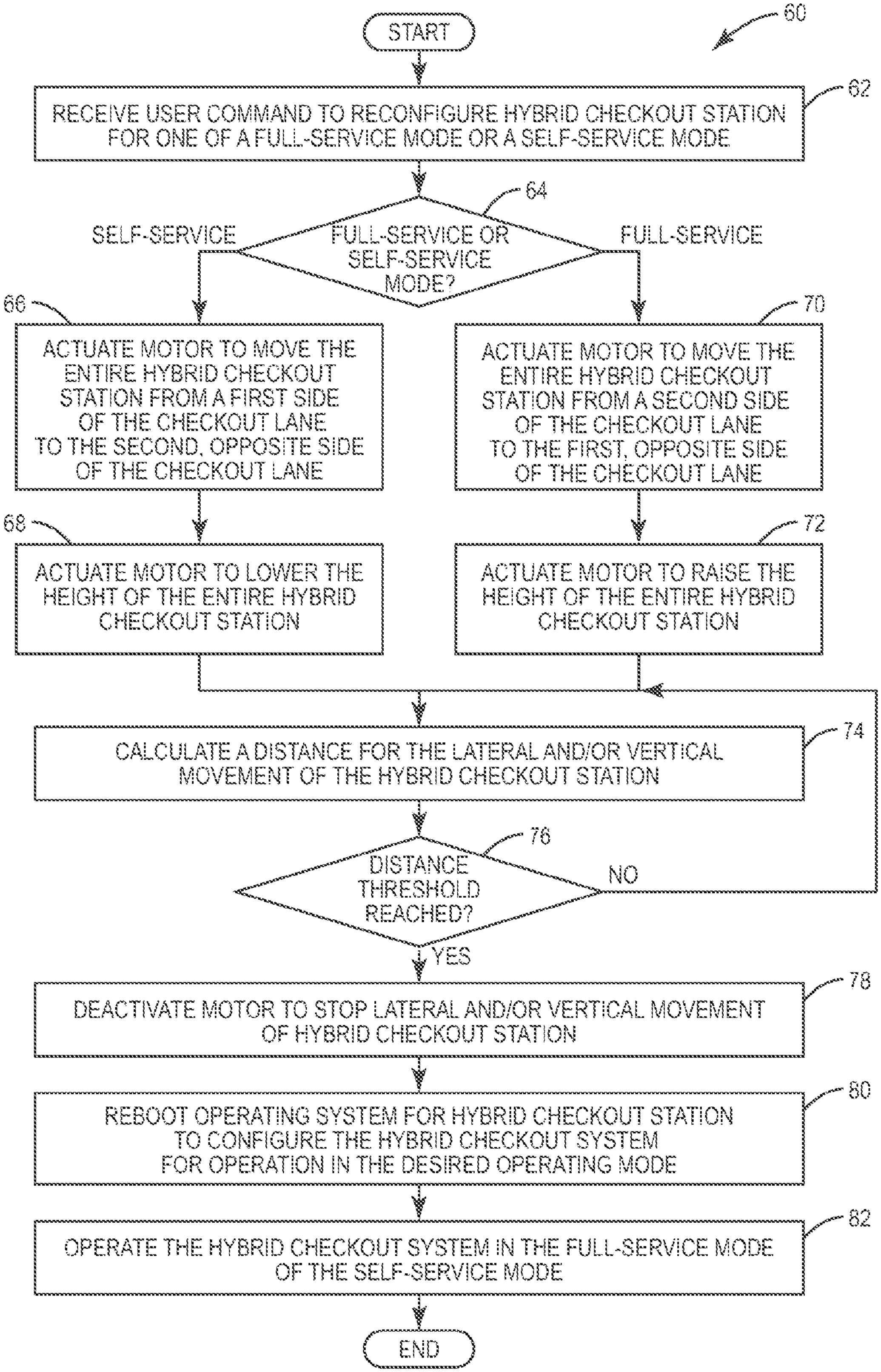
FIG. 4 is a flow diagram illustrating a method for reconfiguring a hybrid checkout station according to one embodiment of the present disclosure.

FIG. 4 is a flow diagram illustrating a method 60 for switching the operating mode of a hybrid checkout station 10 from one of an employee-assisted mode and a self-service mode, to the other of the employee-assisted and self-service modes according to one embodiment of the present disclosure. FIG. 4 begins with the hybrid station 10 receiving a user command from the merchant, for example, to switch its operating mode (box 62). In one embodiment, the merchant may enter the command manually via a keypad or other input/output user interface associated with the hybrid station 10. Such user interfaces may be the same user interface used by the merchant to log onto the hybrid station 10. Alternatively, the command to switch operating modes may be sent to the hybrid station via a communications link established with a central controller.

Regardless of how the hybrid station 10 receives the user command, however, a processor circuit at the hybrid station 10 is configured to control the motor 40 and the other drive mechanisms at hybrid station 10 to perform the operating mode switch. Particularly, if the command is to switch the operating mode of the hybrid station 10 from the employee-assisted mode to the self-service mode (box 64), the processor generates control signals that actuate the motor 40 to move the entire hybrid station from a first position on a first side of the checkout lane 30 laterally across the checkout lane 30 to a second position on a second side of the checkout lane 30 (box 66).

Additionally, in some embodiments, the processor circuit will also generate control signals to actuate the motor 40 (or a different motor) to lower the vertical height of the hybrid station 10 (box 68). This is because in some places, the height of a hybrid station 10 operating in the employee-assisted mode is slightly higher than in other operating modes. The higher vertical height allows for merchants performing the checkout process to sit on a chair or stool and still comfortably be able to control the hybrid station 10. However, these higher heights may not be comfortable or practical for customers performing a self-checkout process at the hybrid station 10. Therefore, this embodiment automatically alters the vertical height of the hybrid station 10 to a predetermined height based on the operating mode of the hybrid station 10.

If the command is to switch the operating mode of the hybrid station 10 from the self-service mode to the employee-assisted mode (box 64), the processor generates control signals that actuate the motor 40 to move the entire hybrid station 10 from the second position on second side of the checkout lane 30 laterally across the checkout lane 30 to the first position on the first side of the checkout lane 30 (box 70). Additionally, the processor circuit at the hybrid station 10 could generate control signals that actuate the motor 40 to lower the height of the hybrid station 10 to a predetermined height that is comfortable for customers performing a self-checkout process (box 72).

In one embodiment of the present disclosure, the hybrid station 10 is configured to automatically determine its position on checkout lane 30, and use that information to control when to stop the lateral and/or vertical movement of the hybrid station 10. More specifically, the processor circuit at the hybrid station 10 is configured to periodically calculate the lateral and/or vertical distance traveled by the hybrid station 10 responsive to receiving the user command (box 74). There are many different methods for determining these distances, but in one embodiment, the processor circuit receives feedback from one or more sensors associated with the hybrid station 10, and uses that data to compute the lateral and/or vertical distances using techniques well-known in the art. Periodically, the processor circuit at the hybrid station 10 will compare the computed lateral and/or vertical distances to corresponding predefined threshold distances (box 76). So long as the computed distances do not exceed their respective thresholds, the hybrid station 10 will continue its lateral and/or vertical movement (box 74). When the computed distances reach or exceed their respective thresholds, however, the processor circuit will generate control signals to deactivate the motor 40 to cease the lateral and/or vertical movements of the hybrid station 10 (box 78).

Those skilled in the art will appreciate that such an automated method is not the only way in which to cease the movement of hybrid station 10. Rather, the lateral and/or vertical movement of the hybrid station 10 may also be stopped manually by the merchant. For example, in one embodiment, the merchant may employ the user interface to input one or more stop commands to cease the movements regardless of the distances. In other embodiments, the motor 40 may continue to drive the lateral and/or vertical movement of hybrid station 10 so long as the merchant actuates a button electrically connected to the processor circuit of the hybrid station 10. When the merchant releases the button, however, the processor circuit at the hybrid station 10 would generate the control signals to cease driving the hybrid station 10 movement.

In many cases, hybrid checkout stations, such as hybrid station 10, comprise a software platform upon which the checkout functions of hybrid station 10 operate. However, the checkout functions of the hybrid station 10 may differ between operating modes. Therefore, in one embodiment, the platform (e.g., the operating system and/or the checkout software applications) executing at hybrid station 10 may also need to be re-initialized responsive to switching the operating mode to ensure that hybrid station 10 is executing the appropriate checkout functions (box 80). Once the hybrid station 10 is moved into position and is at the proper height, and once the platform is operating properly, the hybrid station 10 may be used to checkout a customer in its commanded operating mode (box 82).

Figure 5:
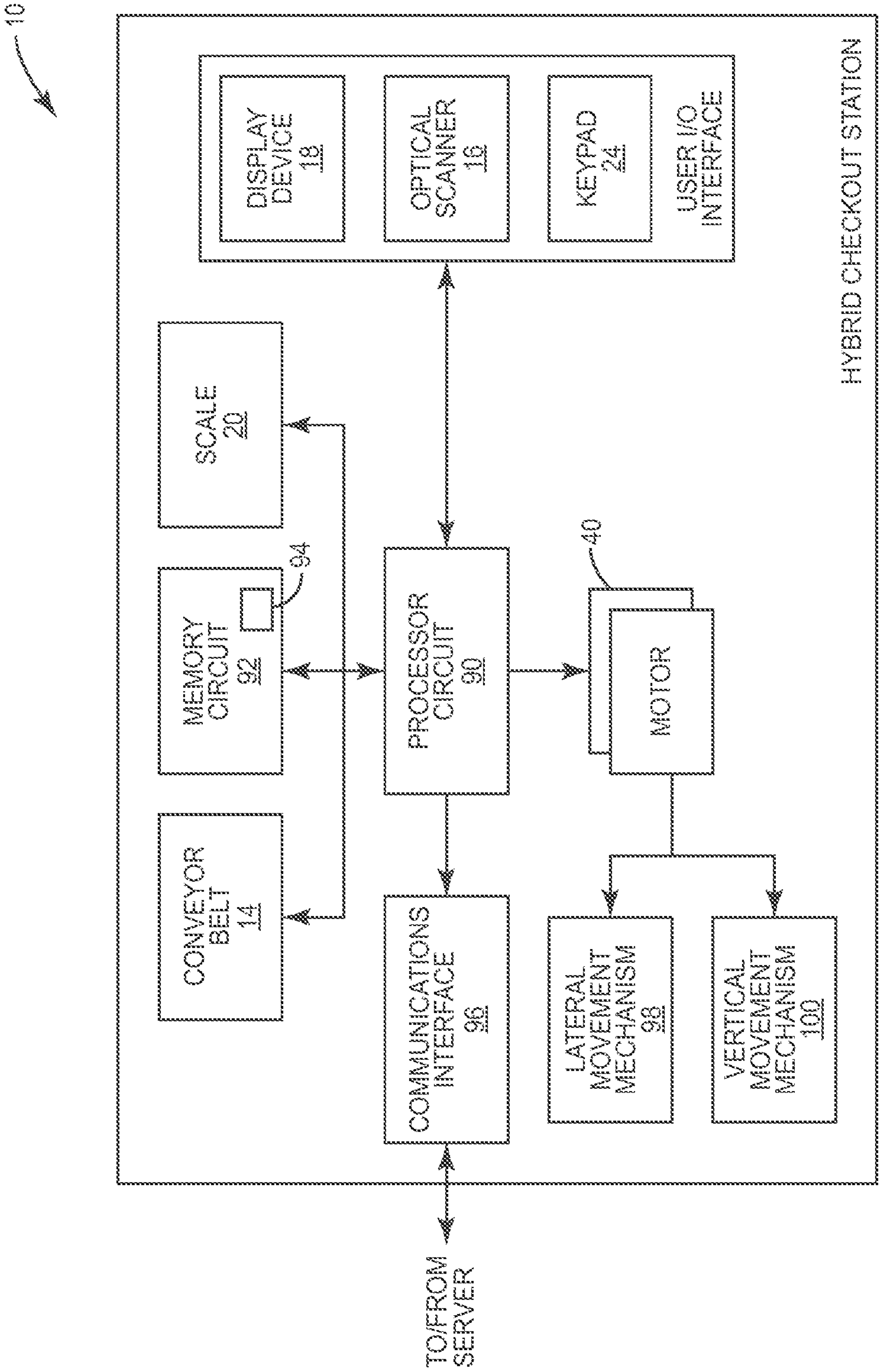
FIG. 5 is a functional block diagram illustrating some components of a hybrid checkout station configured according to one embodiment.

FIG. 5 is a functional block diagram illustrating a hybrid checkout station 10 configured according to one embodiment of the present disclosure. Those of ordinary skill in the art will appreciate, however, that the components seen in FIG. 5 are merely illustrative, and that the hybrid checkout station 10 may other components not specifically depicted in the figures.

As seen in FIG. 5, the hybrid station 10 configured according to one embodiment of the present disclosure comprises, as previously stated, a conveyor belt 14, a scale 20, a user I/O interface having an optical scanner 16, a display device 18, and a keypad or keyboard 24 to accept user input, and one or more motors 40 configured to move the entirety of the hybrid station 10 laterally across a checkout lane 30, as well as vertically, based on commands received from the user I/O interface to switch between operating modes. As previously stated, each of these components is contained within, or on, the cabinetry 12 of hybrid station 10, and may be moved laterally and/or vertically along with hybrid station 10.

Additionally, the cabinetry 12 of the hybrid station 10 also houses a processor circuit 90, a memory circuit 92 that stores a control application 94, a communications interface 96, and lateral and vertical drive mechanisms 98, 100 that are operatively connected to the one or more motors 40.

Processor circuit 90 may be part of a computing device housed within cabinetry 12, and thus, may be implemented by one or more microprocessors, hardware, firmware, or a combination thereof. Processor circuit 90 generally controls the operation and functions of the hybrid station 10, which include, but are not limited to, the checkout functions for checking out a customer in both the employee-assisted operating mode and the self-service operating mode, and communicating with one or more remote computer servers to identify the items selected by a customer and determine their respective prices. In addition, the processor circuit 90 is configured to generate the control signals, responsive to receiving the appropriate user commands, to actuate the one or motors 40 to move the hybrid station 10 laterally across a checkout lane, as well as to alter the vertical height of the hybrid station 10, as previously described.

The memory circuit 92 may comprise any non-transitory, solid state memory or computer readable media known in the art. Suitable examples of such media include, but are not limited to, ROM, DRAM, Flash, or a device capable of reading computer-readable media, such as optical or magnetic media. Although not specifically shown in the figures, the memory circuit 92 may be part of the same computing device controlled by the processor circuit 90, or it may be separate from such a computing device. Regardless of its configuration, however, the memory circuit 92 stores a control application 94 having the logic and instructions that, when executed by the processor circuit 90, control the processor device 90 to move the hybrid station 10 laterally and/or vertically, as previously described.

The communications interface 96 comprises any communication interface circuit known in the art that enables the processor circuit 90 to communicate data and signals with other remote devices via one or more communications networks (not shown) using any protocol or protocols known in the art. For example, the communications interface 96 may communicatively connect the processor circuit 90 at hybrid station 10 to one or more central servers (not shown), databases (not shown) or other remote devices via one or more public or private IP communications networks. Thus, in one embodiment, communications interface 96 comprises an ETHERNET card. In another embodiment, however, communications interface 96 comprises a wireless interface circuit or card configured to connect to these remote devices via one or more wireless access networks (not shown). In at least some embodiments, however, the communications interface 96 is part of the same computing device as that of the processor circuit 90 and memory circuit 92, and thus, is also contained within, and is carried by, the cabinetry 12.

The one or more motors 40, as stated above, may comprise any of one or more electrically driven motors known in the art. As seen in FIG. 5, the one or more motors 40 are operatively connected to a lateral drive mechanism 98 and a vertical drive mechanism 100. The lateral drive mechanism 98 may comprise the axles 42, 44 and the wheels 46, 48 previously described, but may also include the appropriate gears and linkages necessary to operatively connect the axles 42, 44 and wheels 46, 48 to the one or more motors 40 that move the hybrid station 10 laterally across the checkout lane 30, as previously described. Similarly, the vertical drive mechanism 98 may comprise the appropriate gears and linkages necessary to raise and lower the vertical height of the hybrid station 10, as previously described. Additionally, one or both of the drive mechanisms 98, 100 may comprise one or more sensors that provide feedback to the processor circuit 90 regarding the distance traveled by the hybrid station 10, as previously described.

In operation, the processor circuit 90, which communicatively connects to the one or more motors 40 and the I/O interface, receives user commands to switch the current operating mode of the hybrid station 10. In response to those commands, the processor circuit 90 generates the appropriate control signals to send to the one or more motors 40 to control the operation of the lateral and/or vertical drive mechanisms 98, 100. As stated previously, the control signals control the one or more motors 40 to start and stop the lateral and/or vertical movement of the hybrid station via the lateral and/or vertical drive mechanisms, as previously described.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for reconfiguring a hybrid checkout station between an employee-assisted mode and a self-service mode, the method comprising:

receiving, at a hybrid checkout station configured to operate in one of an employee-assisted mode and a self-service mode, a user command to reconfigure the hybrid checkout station to operate in the other of the employee-assisted mode and the self-service mode;

actuating a motor at the hybrid checkout station to move the hybrid checkout station laterally across a checkout lane from a first position to a second position responsive to the user command; and operating the hybrid checkout station in the other of the employee-assisted mode and the self-service mode in the second position.

2. The method of claim 1 further comprising altering a vertical height of the hybrid checkout station based on whether the user command configures the hybrid checkout station to operate in the employee-assisted mode or the self-service mode.

3. The method of claim 2 wherein altering the vertical height of the hybrid checkout station comprises:

decreasing the vertical height of the hybrid checkout station when reconfiguring the hybrid checkout station to operate in the self-service mode; and increasing the vertical height of the hybrid checkout station when reconfiguring the hybrid checkout station to operate in the employee-assisted mode.

4. The method of claim 1 wherein the first position is located on a first side of the checkout lane, and wherein the second position is located on a second side of the checkout lane opposite the first side.

5. The method of claim 1 further comprising:

calculating a distance for the lateral movement for the hybrid checkout station when the hybrid checkout station moves between the first and second positions;

determining whether the distance exceeds a predetermined threshold value; and automatically deactivating the motor responsive to the calculated distance exceeding the predetermined threshold value.

6. The method of claim 1 wherein operating the hybrid checkout station in the other of the employee-assisted mode and the self-service mode in the second position comprises restarting an operating system of the hybrid checkout station responsive to determining that the hybrid checkout station is in the second position.

7. A hybrid checkout station comprising:

a user interface configured to receive user commands associated with controlling an operating mode of the hybrid checkout station, wherein the hybrid checkout station is configured to operate in one of an employee-assisted mode and a self-service mode; and a processor circuit configured to:

receive a user command to reconfigure the hybrid checkout station to operate in the other of the employee-assisted mode and the self-service mode; and move the hybrid checkout station laterally across the checkout lane from a first position to a second position responsive to receiving the user command.

8. The hybrid checkout station of claim 7 further comprising a motor, and wherein the processor circuit is further configured to actuate the motor to move the hybrid checkout station laterally across the checkout lane responsive to receiving the user command.

9. The hybrid checkout station of claim 8 wherein the motor comprises:

a first motor configured to move the hybrid checkout station laterally across the checkout lane; and a second motor configured to adjust a vertical height of the hybrid checkout station based on whether the user command is to reconfigure the hybrid checkout station for the employee-assisted mode or the self-service mode.

10. The hybrid checkout station of claim 8 further comprising a housing, and wherein the motor is disposed within the housing.

11. The hybrid checkout station of claim 7 wherein the processor circuit is further configured to alter a vertical height of the hybrid checkout station depending on whether the user command reconfigures the hybrid checkout station to operate in the employee-assisted mode or the self-service mode.

12. The hybrid checkout station of claim 11 wherein to alter the vertical height of the hybrid checkout station, the processor circuit is configured to:

decrease the vertical height of the hybrid checkout station responsive to receiving the user command reconfiguring the hybrid checkout station to operate in the self-service mode; and increase the vertical height of the hybrid checkout station responsive to receiving the user command reconfiguring the hybrid checkout station to operate in the employee-assisted mode.

13. The hybrid checkout station of claim 7 wherein the first position is located on a first side of the checkout lane, and wherein the second position is located on a second side of the checkout lane opposite the first side.

14. The hybrid checkout station of claim 7 wherein the processor circuit is further configured to:

calculate a distance of the lateral movement of the hybrid checkout station when the hybrid checkout station moves between the first and second positions;

determine whether the calculated distance exceeds a predetermined threshold value; and automatically deactivate the motor responsive to the calculated distance exceeding the predetermined threshold value.

15. The hybrid checkout station of claim 7 further comprising:

an optical scanning device configured to scan items selected by a customer; and a display device configured to display the scanned prices to the customer.

16. A computer program product for a hybrid checkout station, the computer program product comprising a non-transitory computer readable medium having computer code stored thereon that, wherein when executed by a processing circuit, controls the processing circuit to:

receive, while the hybrid checkout station is configured to operate in one of an employee-assisted mode and a self-service mode, a user command to reconfigure the hybrid checkout station to operate in the other of the employee-assisted mode and the self-service mode;

actuate a motor at the hybrid checkout station to move the hybrid checkout station laterally across a checkout lane from a first position on the checkout lane to a second position on the checkout land responsive to the user command; and configure the hybrid checkout station to operate in the other of the employee-assisted mode and the self-service mode in the second position.

17. The computer program product of claim 16 wherein the computer program code is further configured to control the processor circuit to adjust a vertical height of the hybrid checkout station based on whether the user command configures the hybrid checkout station to operate in the employee-assisted mode or the self-service mode.

18. The computer program product of claim 17 wherein to alter the vertical height of the hybrid checkout station, the computer program code is further configured to control the processor circuit to:

decrease the vertical height of the hybrid checkout station when reconfiguring the hybrid checkout station to operate in the self-service mode; and increase the vertical height of the hybrid checkout station when reconfiguring the hybrid checkout station to operate in the employee-assisted mode.

* * * * *